(12) United States Patent
Bushnell

(10) Patent No.: X7984
(45) Date of Patent: Jan. 30, 1834

(54) WATER WHEEL

(76) Inventor: Elisha Bushnell

Elisha Bushnell of Wayne Co. New York
Letters Patent

The Schedule referred to in these Letters Patent and making part of the
same containing a description in the words of the said Elisha Bush
nell himself of his improvement in the construction of Water Wheels.

To all persons to whom these Presents shall come: Elisha Bushnell
of Sodus. County of Wayne and State of New York: send Greeting:
Be it known that I Elisha Bushnell have invented a new and
useful improvement in the construction of water wheels for driving flour
ing mills, grist Mills saw mills, fulling Mills, and other manu
facturing machinery not heretofore known or used which invention &
the manner of using it are as follows. This improvement is con-
structed in the following manner. To one end of the shaft of wood
or iron is attached a cylinder of any given diameter by means of arms
passing thro the shaft or otherwise (as in fig 1 in the plate accompa-
nying this specification) around the sides or outer circumference of
the cylinder & fastened to it are placed the buckets or floats upon which
the water is to act to drive the wheel. The floats are nearly plane.
Each one of them traverses a portion of the circumference of the cylinder
in a spiral line that is to say each bucket inclines or dips
from the upper edge of the cylinder at a given angle to its lower edge.
so that when the wheel is completed the cylinder with the buckets
presents the appearance of a screw of which each bucket forms a
thread. The buckets are so placed on the cylinder that radii of the ax
is of the cylinder passing thro' any part of the plane of the buckets
are always at right angles to that axis - The buckets may be made
of wood or metal and their length and breadth and the dip or in
clination of each may be indefinitely varied (see fig 6. of the
plate and the model of wood with tin buckets accompanying this
specification) The wheel so constructed is placed (the shaft being
perpendicular) in another cylinder made to fit closely around the outer edges of the buckets having only room for the wheel to revolve without the buckets touching the outer cylinder. The water to propel the wheel is introdu ced at the top of the last mentioned cylinder and stands in a mass over the wheel at a height equal to that of the head of water used to drive the wheel. the spaces between the arms being securely stopped so that the water has no way of passing downwards excepting thro' the spaces between the buckets – or the wheel may be placed in a cylinder fixed in the bottom of a flume or penstock having its upper rim even with such bottom & made to fit closely to the wheel as above described – Or the outer cylinder may be attached to the wheel and revolve with it. in such case the out- er cylinder containing the wheel may be of indefinitely varied dimensions above the upper rim of the wheel. and the water may be brought in at the top of the cylinder, or thro: the bottom of the shaft or around it.
When the water is brought in at the bottom it may be suffered to rise in the cylinder to the height of the head or its surface may be confined to with in a greater or less distance of the top of the wheel, by means of a tight head in the cylinder in which the wheel is placed. The shaft of the wheel may be made so large as to form the wheel without the use of arms. the buckets being placed directly on the shaft and this would be the best form when the shaft is to lie horizontally. In this mode of construction the buckets should occupy a greater portion of the length of the shaft and the wheel may revolve in a horizontal cylinder or flume similar to that described for the perpendicular shaft or it may be placed in any un- confined stream and be driven by force of the current – another mode is to have two wheels placed with their shafts horizontally & united by a crank between the wheels, the water operating upon the outer ends of the wheels towards the centre of the shaft.

This form will save nearly all friction upon the gudgeons. The improvement above described is particularly adapted for upright shafts when great velocity is required – It is believed that gearing may be dispensed with in nearly all cases under almost any head – The wheel need not exceed four, or six inches in thickness, and it will serve under water as long as the head continues undiminished above - In witness whereof I have hereunto subscribed my name this eleventh day of October 1832

Witnesses
John McHolley
R W Ashley

Elisha Bushnell

Eod 924 words (Patented 30th January 1834)

JHT